(12) United States Patent
Kashyap (10) Patent No.: US 7,987,225 B2
(45) Date of Patent: Jul. 26, 2011

(54) METHOD FOR REMEMBERING RESOURCE ALLOCATION IN GRIDS

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1208 days.

(21) Appl. No.: 11/021,001

(22) Filed: Dec. 22, 2004

(65) Prior Publication Data

US 2006/0168218 A1 Jul. 27, 2006

(51) Int. Cl.
*G06F 15/16* (2006.01)
*G06F 15/173* (2006.01)

(52) U.S. Cl. ........................................ 709/201; 709/225
(58) Field of Classification Search .................. 709/225, 709/201
See application file for complete search history.

(56) References Cited

U.S. PATENT DOCUMENTS

| | | | |
|---|---|---|---|
| 5,251,317 A | 10/1993 | Iizuka et al. | |
| 5,687,372 A | 11/1997 | Hotea et al. | |
| 5,745,694 A | 4/1998 | Egawa et al. | |
| 6,401,110 B1 | 6/2002 | Freitas et al. | |
| 6,463,454 B1 * | 10/2002 | Lumelsky et al. | 718/105 |
| 6,542,920 B1 | 4/2003 | Belkin et al. | |
| 6,594,779 B1 * | 7/2003 | Chandra et al. | 714/15 |
| 6,714,980 B1 | 3/2004 | Markson et al. | |
| 2003/0050972 A1 * | 3/2003 | Felt et al. | 714/15 |
| 2003/0120701 A1 * | 6/2003 | Pulsipher et al. | 709/102 |
| 2003/0233602 A1 * | 12/2003 | Lindquist et al. | 714/47 |
| 2004/0015976 A1 | 1/2004 | Lam | |
| 2004/0015977 A1 | 1/2004 | Benke et al. | |
| 2004/0044718 A1 | 3/2004 | Ferstl et al. | |
| 2004/0068731 A1 | 4/2004 | Davis et al. | |
| 2004/0098606 A1 * | 5/2004 | Tan et al. | 713/200 |
| 2007/0288512 A1 * | 12/2007 | Matsubara et al. | 707/103 R |
| 2008/0072230 A1 * | 3/2008 | Jackson | 718/104 |

OTHER PUBLICATIONS

J. Joseph, M. Ernest and C. Fellenstein, Evolution of Grid computing architecture and Grid adoption models, IBM Systems Journal 43 (2004) (4), pp. 624-645. (accepted for publication Jun. 4, 2004).*
U.S. Appl. No. 60/625,894, filed Nov. 8, 2004.*

* cited by examiner

*Primary Examiner* — Phuoc Nguyen
*Assistant Examiner* — June Sison
(74) *Attorney, Agent, or Firm* — Kunzler Needham Massey & Thorpe (57) ABSTRACT

A grid manager manages numerous submissions of a job request in view of maintaining a high degree of performance continuity in the execution of the numerous submissions of the job request by one or more job handlers. To this end, the grid manager receives an initial submission of the job request specifying one or more resource selection parameters, and selects one or more job handlers for executing the initial submission of the job request based on the specified resource selection parameter(s). To facilitate a high degree of performance continuity in the execution of a resubmission of the job request, the grid manager assigns a job request identification corresponding to a resource selection parameter compilation including the specified resource selection parameter(s) as well as each resource selection parameter unspecified in the job request that facilitates a selection of one or more job handlers for executing the resubmission of the job request.

30 Claims, 6 Drawing Sheets

METHOD FOR REMEMBERING RESOURCE ALLOCATION IN GRIDS

FIELD OF INVENTION

The present invention generally relates to the allocation of resources within a computer grid. The present invention specifically relates to minimizing performance fluctuations in the execution of numerous submissions of a job request within a computer grid.

BACKGROUND OF THE INVENTION

A computer grid is a distributed computing environment interconnecting computer devices over one or more computer networks where the types of computer devices employed within a computer grid is essentially limitless. A central grid infrastructure of the computer grid employs one or more grid managers for managing a selection of one or more suitable job handlers for executing a job request. The selected job handler (s) will perform the computations and tasks required to fulfill the job request and return the results to the source of the job request.

To this end, a job request specifies resource selection parameters for facilitating a selection of suitable job handler (s) from a resource pool of job handlers available in the grid for a successful execution of the job request by the selected job handler(s). Examples of such resource selection parameters include, but are not limited to, (1) specified types of services required to perform the required operation(s), (2) specified operational characteristics related to speed, cost, capacity or other well known factors associated with performing the required operation(s), (3) a specified number and/or type of processing units for performing the required operation (s), (4) specified hardware, software and/or firmware for performing the required operation(s), (5) specified licenses providing authorization to perform the required operation(s), and (6) a specified level of security to perform the required operation(s).

The selection of one or more job handlers for executing the job request is dependent upon the resource selection parameters related to a successful execution of the job request, some of which may be unspecified in the job request, as well as the availability and capability of each job handler in the resource pool of the job handlers. Typically, the actual job handler(s) selected by the grid manager(s) to execute the job request will be transparent to the source of the job request. However, the source of the job request may notice fluctuations in the execution of the job request over many submissions of the job request from the source to the grid manager(s) when different job handler(s) are allocated to different submissions of the job request. Particularly, if one or more of the resource selection parameters are unspecified by the source of the job request.

A challenge therefore for the computer industry is to provide the source of the job request with a high degree of performance continuity over numerous resubmissions of the job request from the source to the grid manager(s) while retaining the capability to flexibly select job handler(s) from the resource pool of job handlers.

SUMMARY OF THE INVENTION

The present invention provides a new and unique grid manager for selecting one or more job handlers for executing numerous submissions of the same job request.

One embodiment of the present invention is a signal bearing medium tangibly embodying a program of machine-readable instructions executable by a processor to perform operations comprising (1) receiving an initial submission of the job request specifying at least one resource selection parameter for facilitating a selection of at least one job handler for executing the initial submission of the job request, (2) selecting a first set of at least one job handler for executing the initial submission of the job request based on the at least one resource selection parameter specified in the job request, and (3) assigning a job request identification to the job request, the job request identification corresponding to a resource selection parameter compilation including the at least one resource selection parameter specified in the job request and each resource selection parameter unspecified in the job request that facilitates a selection of a second set of job handlers for executing any resubmission of the job request.

A second embodiment of the present invention is a system employing a processor, and a memory for storing instructions operable with the processor for (1) receiving an initial submission of the job request specifying at least one resource selection parameter for facilitating a selection of at least one job handler for executing the initial submission of the job request, (2) selecting a first set of at least one job handler for executing the initial submission of the job request based on the at least one resource selection parameter specified in the job request, and (3) assigning a job request identification to the job request, the job request identification corresponding to a resource selection parameter compilation including the at least one resource selection parameter specified in the job request and each resource selection parameter unspecified in the job request that facilitates a selection of a second set of job handlers for executing any resubmission of the job request.

A third embodiment of the present invention is a server including (1) means for receiving an initial submission of the job request specifying at least one resource selection parameter for facilitating a selection of at least one job handler for executing the initial submission of the job request, (2) means for selecting a first set of at least one job handler for executing the initial submission of the job request based on the at least one resource selection parameter specified in the job request, and (3) means for assigning a job request identification to the job request, the job request identification corresponding to a resource selection parameter compilation including the at least one resource selection parameter specified in the job request and each resource selection parameter unspecified in the job request that facilitates a selection of a second set of job handlers for executing any resubmission of the job request.

A fourth embodiment of the present invention is a method of operating a grid manager. The method includes (1) receiving an initial submission of the job request specifying at least one resource selection parameter for facilitating a selection of at least one job handler for executing the initial submission of the job request, (2) selecting a first set of at least one job handler for executing the initial submission of the job request based on the at least one resource selection parameter specified in the job request, and (3) assigning a job request identification to the job request, the job request identification corresponding to a resource selection parameter compilation including the at least one resource selection parameter specified in the job request and each resource selection parameter unspecified in the job request that facilitates a selection of a second set of job handlers for executing any resubmission of the job request.

A fifth embodiment of the present invention is system employing a job requester and a grid manager. The job requester initially submits a job request to the gird manager that specifies at least one resource selection parameter for facilitating a selection of at least one job handler for executing the initial submission of the job request. In response to the initial submission of the job request, the grid manager (1) selects a first set of at least one job handler for executing the initial submission of the job request based on the at least one resource selection parameter specified in the job request, and (2) assigns a job request identification to the job request, the job request identification corresponding to a resource selection compilation including the at least one resource selection parameter specified in the job request and each resource selection parameter unspecified in the job request that facilitates a selection of a second set of job handlers for executing any resubmission of the job request.

The forgoing embodiments as well as other embodiments, objects, and aspects as well as features and advantages of the present invention will become further apparent from the following detailed description of various embodiments of the present invention, read in conjunction with the accompanying drawings. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
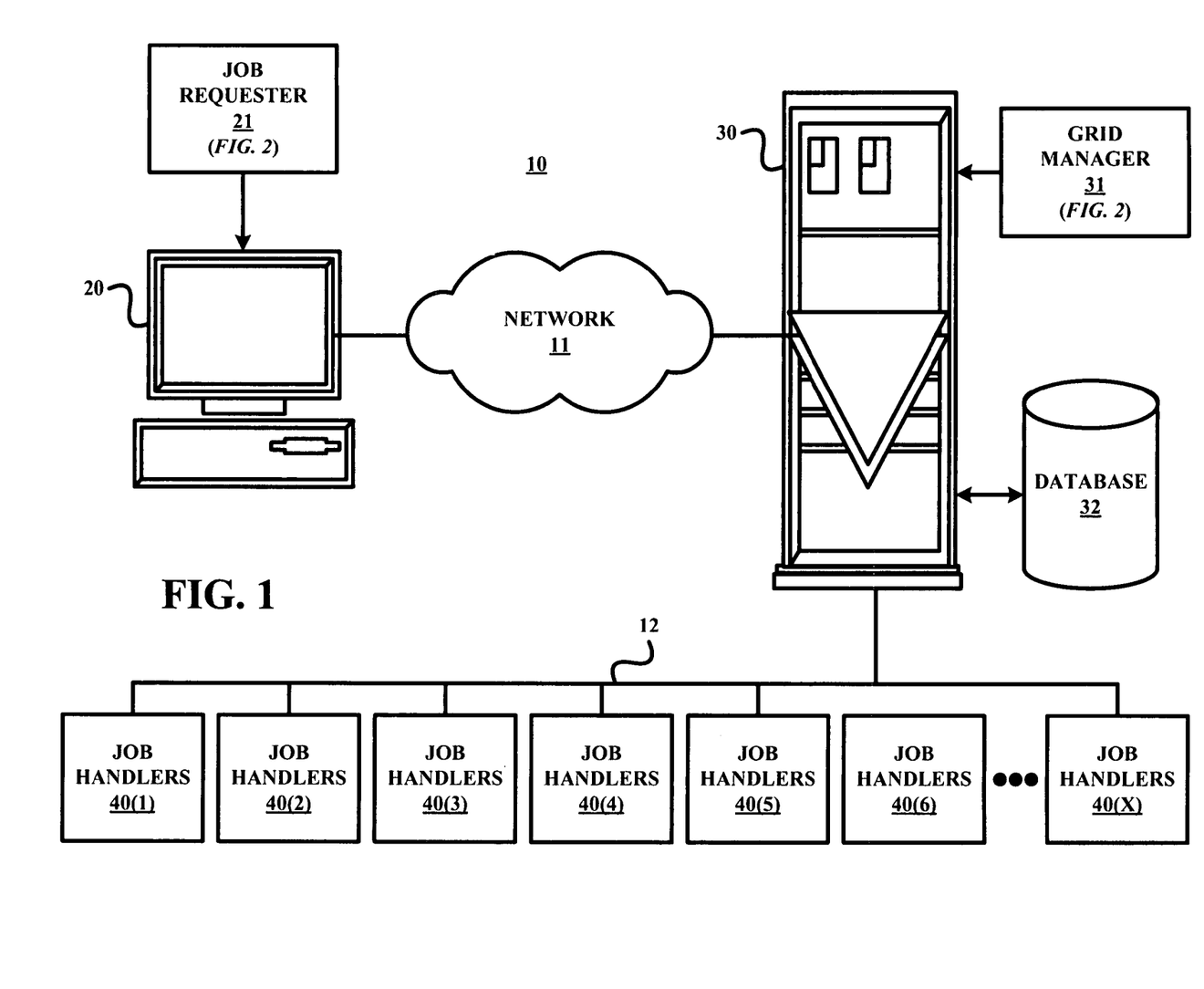
FIG. 1 illustrates an exemplary embodiment of a computer grid in accordance with the present invention.

FIG. 1 illustrates an exemplary computer grid 10 of the present invention employing a client 20 connected via a network 11 to a server 30 containing a database 32. Server 30 is also interconnected via a network 12 to an X number of job handlers 40, where $X \geq 1$. In one embodiment, job handlers 40 represent a pool of resources conventionally employed within a computer grid such as computer grid 10. Examples of job handlers 40, include, but are not limited to, (1) computer servers with varying resource characteristics (e.g., a number of central processing units ("CPUs"), the speed of the CPUs, a number of network cards, types of network connectivity, memory, memory caches and disk capacity), (2) printers, (3) network routers and switches, and (4) storage devices (e.g., tape drives and RAID devices).

A new and unique job requester 21 is embodied in a software module installed on client 20 for submitting job requests to server 30 in accordance with the present invention. A new and unique grid manager 31 is embodied in a software module installed on server 30 for selecting one or more job handlers 40 for executing a particular job request from job requester 21 in accordance with the present invention. To this end, job requester 21 and grid manager 31 collectively implement a job request management method of the present invention represented by a flowchart 50 and a flowchart 60 illustrated in FIG. 2.

Figure 2:
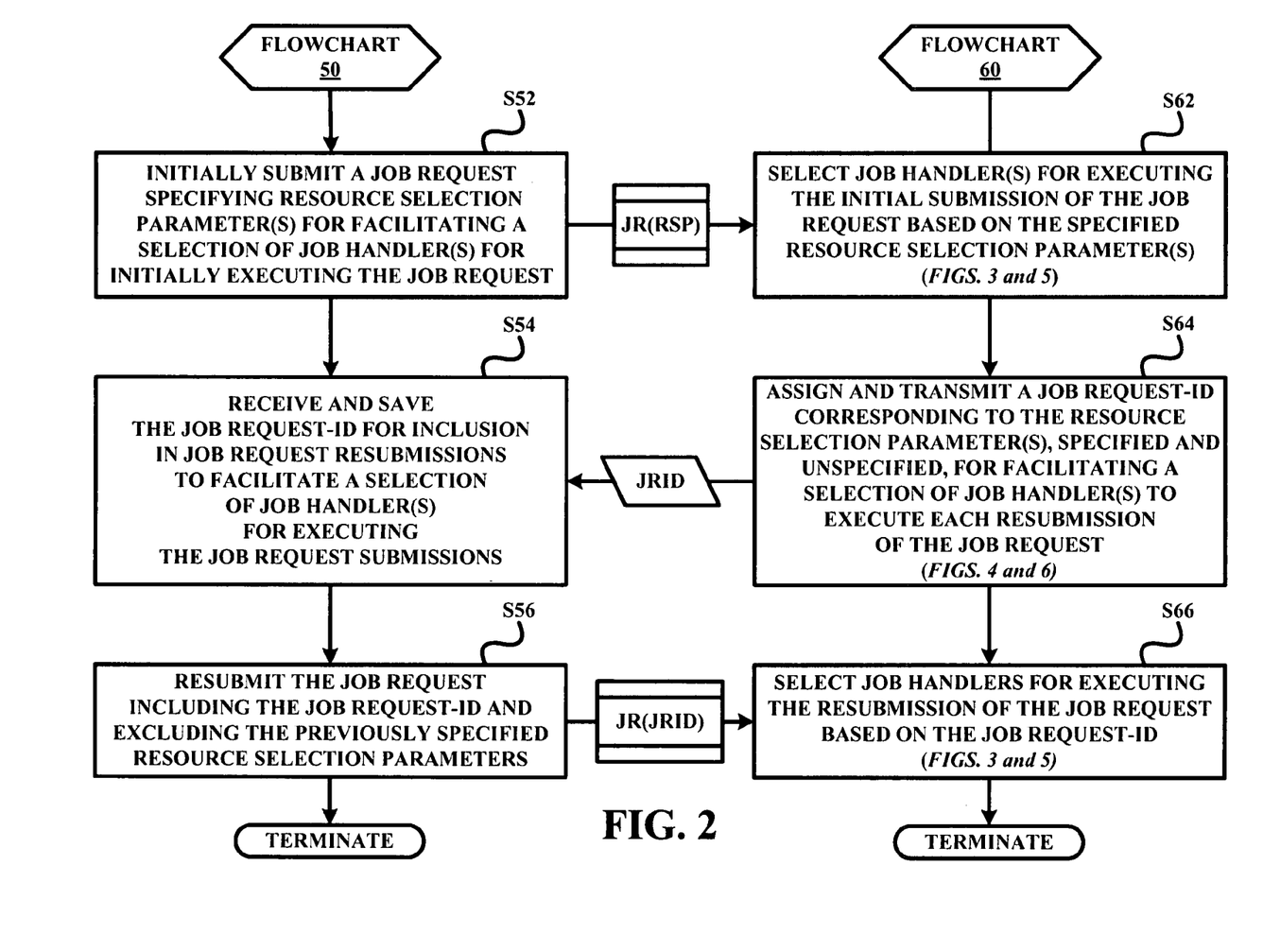
FIG. 2 illustrates flowcharts representative of a job request management method in accordance with the present invention.

Referring to FIGS. 1 and 2, a stage S52 of flowchart 50 encompasses job requester 21 initially submitting a job request JR specifying one or more resource selection parameters RSP for facilitating a selection by grid manager 31 of one or more job handlers 40 for executing the initial submission of job request JR by job requester 21. In response thereto, a stage S62 of flowchart 60 encompasses grid manager 31 selecting one or more job handler(s) 40 for executing the initial submission of job request JR based on the resource selection parameter(s) RSP specified in job request JR. In one embodiment, grid manager 31 will select one or more job handlers 40 suitable for executing job request JR in accordance with the resource selection parameter(s) RSP and any job request policy employed by the grid manager 31. Specifically, if none of the job handlers 40 is suitable in accordance with the resource selection parameter(s) RSP for executing job request JR, or if suitable job handlers 40 are physically unavailable to execute job request JR within a reasonable period of time, then grid manager 31 may, in dependence upon the job request policy, either (1) queue job request JR until suitable job handlers 40 are physically available, (2) attempt to fulfill job request JR with less than suitable job handlers 40, or (3) deny job request JR.

Assuming one or more job handlers 40 were selected by grid manager 31 during stage S62, grid manager 31 will proceed to a stage S64 of flowchart 60 to assign and transmit a job request identification JRID to job requester 21, which in turn receives and saves job request identification JRID during a stage S54 of flowchart 50. Job request identification JRID corresponds to the resource selection parameter(s) RSP specified in job request JR as well as each resource selection parameter unspecified by job request JR that relates to a resource characteristic of the job handler(s) 40 selected by grid manager 31 during stage S62 to execute job request JR. This compilation of resource selection parameters is recognized by the grid manager 31 as being related to the resource characteristics of all job handlers 40 selected during stage S62 and consists, partially or entirely, of all of the resource selection parameters related to the resource characteristics of all job handlers 40 within grid 10.

For example, during stage S52, job request JR may specify a resource selection parameter RSP of four (4) machines, each having a particular type of processor and a particular size of memory. During stage S62, grid manager 31 will select one or more job handlers based on the specified resource selection parameters RSP. For example, in a grid where each job handler is a machine, then grid manager 31 would select four (4) job handlers during stage S62 based on the specification of four (4) machines. Prior to, during or upon an execution of job request JR by the selected job handler(s) 40, grid manager 31 will assign and transmit job request identification JRID to job requester 21 during stage S64 where job request identification JRID corresponds to the resource selection parameter RSP of four (4) machines, each having a particular type of processor and a particular size of memory, as well as each resource selection parameter unspecified by job request JR that is associated by grid manager 31 for facilitating a selection of one or more job handler(s) 40 for executing any resubmission of job request JR.

In this case, the job handler(s) 40 selected by grid manger 31 during stage S62 may have resource selection parameters that were unspecified by job request JR (e.g., processor caches and sub-version of an operating system), but are recognized by grid manager 31 as resource selection parameters that can be used to select job handler(s) 40 for executing any resubmission of job request JR by job requester 21 or any other job request source with grid 10. Thus, grid manager 31 will link job request identification JRID with such resource selection parameters of the selected job handler(s) that were unspecified by job request JR.

Thereafter, a stage S56 of flowchart 50 encompasses job requester 21 resubmitting job request JR and including job request identification JRID and excluding resource selection parameters RSP specified in the initial submission of job request JR. In response thereto, a stage S66 of flowchart 60 encompasses grid manager 31 selecting one or more job handler(s) 40 for executing the resubmission of job request JR based on job request identification JRID. In one embodiment, grid manager 31 will select one or more job handlers 40 suitable for executing the resubmission of job request JR in accordance with all of the resource selection parameters corresponding to job request identification JRID as well as in accordance with any job request policy employed by grid manager 31. Specifically, if none of the job handlers 40 is suitable in accordance with the resource selection parameters corresponding to job request identification JRID for executing the resubmission of job request JR, or if suitable job handlers 40 are physically unavailable to execute the resubmission of job request JR within a reasonable period of time, then grid manager 31 may, in dependence upon the job request policy, either (1) queue the resubmission of job request JR until suitable handlers 40 are physically available, (2) attempt to fulfill the resubmission job request JR with less than suitable job handlers 40, or (3) deny the resubmission of job request JR.

In an alternative embodiment, job requester 21 can resubmit job request JR during stage S56 including job request identification JRID as well as new resource selection parameters that were not specified in the initial submission of job request JR. In this case, grid manager 31 will identify all resource selection parameters corresponding to job request identification JRID, and select job handler(s) 40 based on the identified resource selection parameters corresponding to job request identification JRID and the new resource selection parameters specified in the resubmission of job request JR. A priority can be given to a resource selection parameter specified in the resubmission of job request JR over its counterpart resource selection parameter corresponding to job request identification JRID.

Job requester 21 and grid manager 31 will execute stages S56 and S66 for each resubmission of job request JR. Those having ordinary skill in the art will appreciate the fact that job requester 21 will receive a high degree of performance continuity over numerous resubmissions of job request JR to grid manager 31, which retains the capability to flexibly select job handlers from the resource pool of job handlers 40.

In practice, the manner by which grid manager 31 implements flowchart 60 is without limit. Thus, the following description of various embodiments of stages S62-S66 of flowchart 60 is not a limitation to the scope of flowchart 60.

Figure 3:
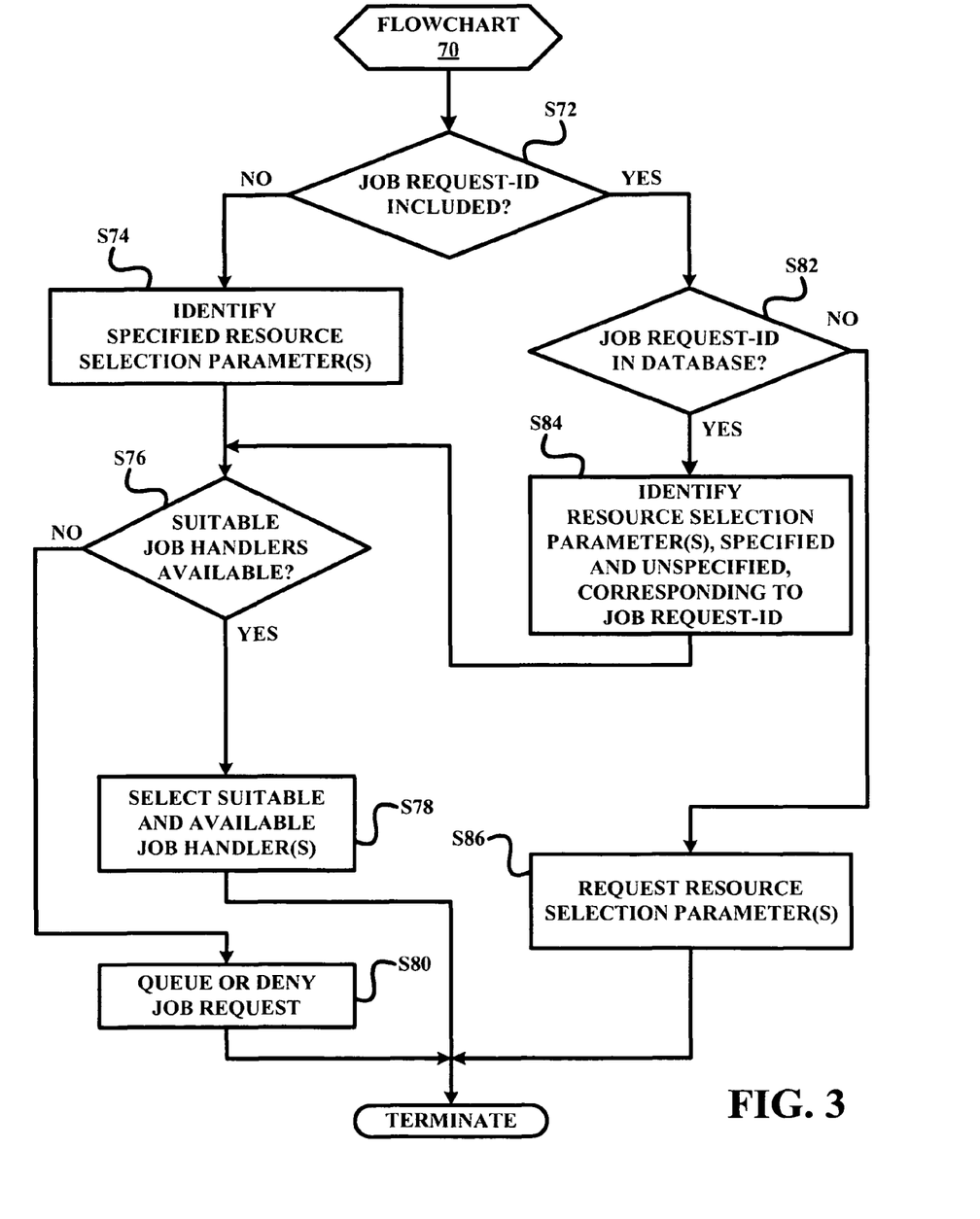
FIG. 3 illustrates a flowchart representative of a first embodiment of a job handler selection method in accordance with the present invention.

FIG. 3 illustrates a flowchart 70 representative of a job handler selection method that can be implemented during stages S62 and S66 of flowchart 60. Referring to FIGS. 1-3, a stage S72 of flowchart 70 encompasses grid manager 31 determining whether job request identification JRID is included in job request JR. If not, then grid manager 31 sequentially proceeds to a stage S74 of flowchart 70 to identify each resource selection parameter RSP specified by job request JR and a stage S76 of flowchart 70 to decide if any job handlers 40 are suitable for executing job request JR in accordance with the specified resource selection parameter(s) RSP and physically available within a reasonable period of time. If so, then grid manager 31 proceeds to a stage S78 of flowchart 70 to select one or more suitable and available job handlers 40 to execute job request JR. Otherwise, grid manager 31 proceeds to a stage S80 of flowchart 70 to queue or deny job request JR.

If grid manager 31 decides during stage S72 that job request identification JRID was included in job request JR, then grid manager 31 proceeds to a stage S82 of flowchart 80 to decide if job request identification JRID is listed in database 32 (FIG. 1). If not, then grid manager 31 proceeds to a stage S86 of flowchart 80 to request resource selection parameter(s) RSP from job requester 21 and terminates flowchart 70 until such at time job request JR is resubmitted by job requester 21 or any other source of grid 10. Otherwise, grid manager 31 sequentially proceeds to a stage S84 of flowchart 70 to identify all resource selection parameters, specified in a previous submission of job request JR and unspecified and recorded in an earlier submission of job request JR, corresponding to a listing of job request identification JRID in database 32. Upon identifying all of the resource selection parameters, grid manager 31 proceeds to stage S76 to decide if any job handlers 40 are suitable for executing job request JR in accordance with all of the resource selection parameters identified during stage S88 and physically available within a reasonable period of time. If so, then grid manager 31 proceeds to stage S78 to select one or more suitable and available job handlers 40 to execute job request JR. Otherwise, grid manager 31 proceeds to a stage S80 of flowchart 70 to queue or deny job request JR.

Those having ordinary skill in the art will appreciate that the job handler(s) 40 selected during stage S76 from resource selection parameters RSP identified in stage S74 in the case of job request JR excluding job request identification JRID, and the job handler(s) 40 selected during stage S76 from all of the resource selection parameters identified during stage S88 in the case of job request JR including job request identification JRID may be either (1) the same exact job handlers 40 or (2) different job handlers 40 having identical or equivalent resource characteristics.

Figure 4:
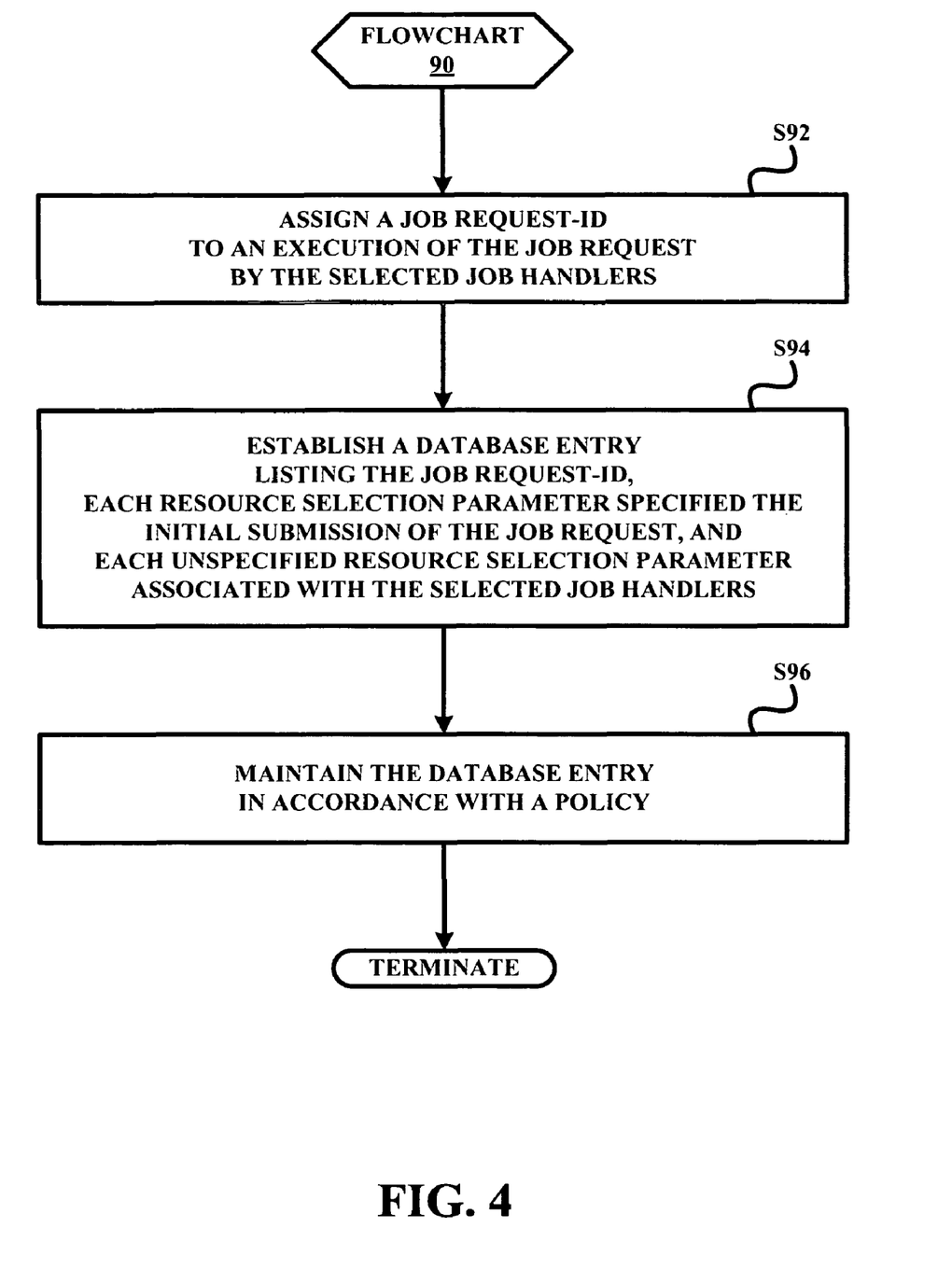
FIG. 4 illustrates a flowchart representative of a first embodiment of a database management method in accordance with the present invention.

FIG. 4 illustrates a flowchart 90 representative of a database management method of the present invention that enables grid manager 31 to implement stages S72, S82 and S84 of flowchart 70 (FIG. 3). Referring to FIG. 4, a stage S92 of flowchart 90 encompasses grid manager 31 assigning job request identification JRID to job request JR prior to, during or upon an execution of the initial submission of job request JR by the selected job handler(s) 40. A stage S94 of flowchart 90 encompasses grid manager 31 establishing a database entry in database 32 that lists job request identification JRID, resource selection parameters RPS specified in the initial submission of job request JR and each resource selection parameter unspecified in the initial submission of job request JR but related to the resource characteristics of the job handler(s) 40 selected to execute the initial submission of job request JR.

A stage S96 of flowchart 90 encompasses grid manager 31 maintaining the database entry in accordance with a database management policy. For example, the database management policy may require a deletion of the database entry if a defined period of time has elapsed since the last resubmission of job request JR. Additionally, in one embodiment, the database management policy will define a technique for updating the database entry to reflect any addition, deletion or modification of a resource selection parameter therein.

Figure 5:
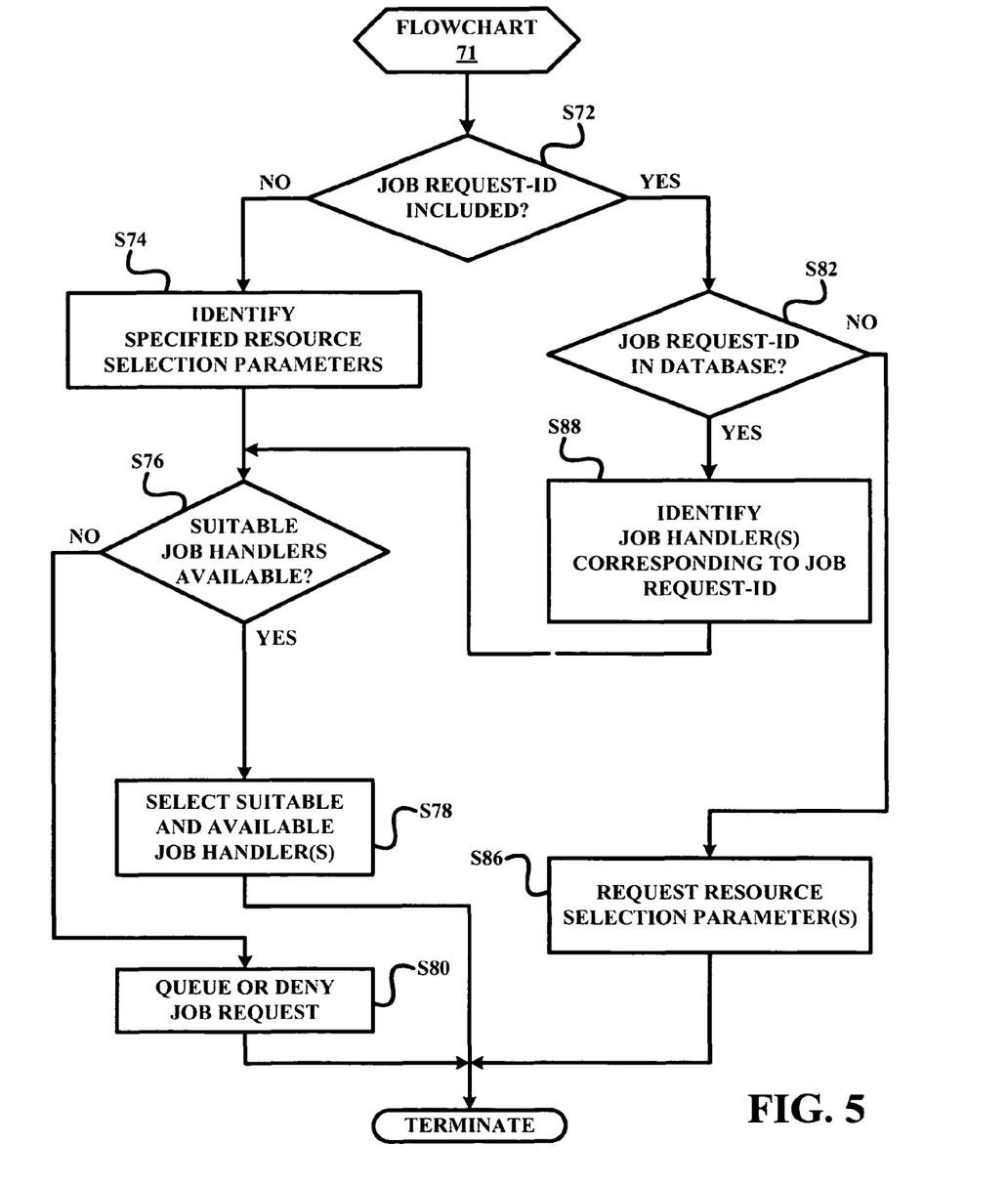
FIG. 5 illustrates a flowchart representative of a second embodiment of a job handler selection method in accordance with the present invention.

FIG. 5 illustrates a flowchart 71 as a modified version of flowchart 70 (FIG. 3). Specifically, flowchart 71 includes a stage S88 as a substitution for stage S84 of flowchart 70 where stage S88 encompasses grid manager 31 identifying job handler(s) 40 corresponding to job request identification JRID, which are already deemed as being suitable for job request JR for purposes of stage S76. In one embodiment, the job handler(s) 40 identified during stage S88 were the job handler(s) 40 previously selected to execute the initial submission of job request JR. Thus, grid manager 31 will re-select these job handler(s) 40 during stage S76 and/or, if necessary, select one or more new job handlers 40 that have identical or equivalent resource characteristics.

Figure 6:
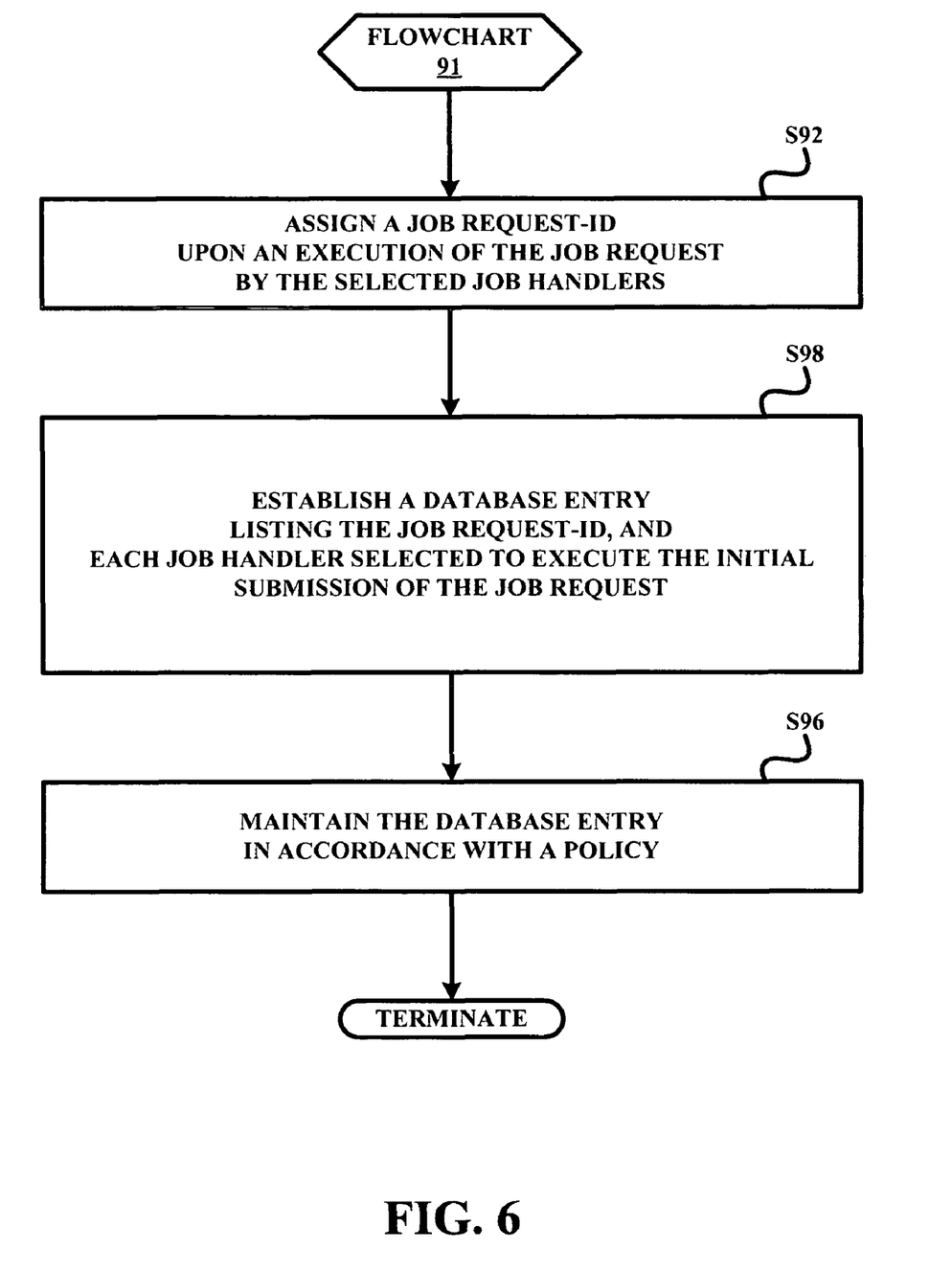
FIG. 6 illustrates a flowchart representative of a second embodiment of a database management method in accordance with the present invention.

FIG. 6 illustrates a flowchart 91 as a modified version of flowchart 90 (FIG. 4). Specifically, flowchart 91 includes a stage S98 as a substitution for stage S94 of flowchart 90 where stage S98 encompasses grid manager 31 establishing a database entry in database 32 that lists job request identification JRID and each job handler 40 selected to execute the initial submission of job request JR. This embodiment indirectly associates resource selection parameters RPS and each unspecified resource selection parameter to job request identification JRID of stage S84 (FIG. 3) by directly associating the selected job handler(s) 40 to job request identification JRID.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

I claim:

1. A non-transitory computer-readable storage medium tangibly embodying a program of machine-readable instructions executable by a processor to perform operations, a job requester and a grid manager collectively implementing the operations, the operations comprising:
   receiving an initial submission of a job request at a grid manager from a job requester, the job request specifying at least one resource selection parameter, the at least one resource selection parameter facilitating a selection of a first set of at least one job handler for executing the initial submission of the job request, the job handlers of the first set suitable for executing the job request in accordance with the at least one resource selection parameter;
   selecting the first set of at least one job handler for executing the initial submission of the job request based on the at least one resource selection parameter specified in the initial submission of the job request;
   determining one or more unspecified resource selection parameters of the job handler selected to execute the job request, which unspecified resource selection parameters were not specified in the initial submission of the job request, each unspecified resource selection parameter relating to a resource characteristic of the job handler selected to execute the job request; and
   assigning a job request identification to the job request, wherein the job request identification corresponds to a resource selection parameter compilation including the at least one resource selection parameter specified in the initial submission of the job request and the one or more unspecified resource selection parameters, wherein the grid manager recognizes the job request identification as the at least one resource selection parameter specified in the initial submission of the job request and the one or more unspecified resource selection parameters, a job handler for executing a resubmission of the job request from any job request source selected using the job request identification, the resubmission of the job request specifying the job request identification and excluding the at least one resource selection parameter.

2. The computer-readable storage medium of claim 1, wherein assigning a job request identification to the job request includes: establishing a database entry listing the job request identification and the resource selection parameter compilation.

3. The computer-readable storage medium of claim 1, wherein assigning a job request identification to the job request includes: establishing a database entry listing the job request identification and the first set of at least one job handler.

4. The computer-readable storage medium of claim 1, wherein the operations further comprise:
   receiving the resubmission of the job request including the job request identification for facilitating the selection of a second set of at least one job handler for executing the resubmission of the job request; and
   selecting the second set of at least one job handler for executing the resubmission of the job request based on the job request identification.

5. The computer-readable storage medium of claim 4, wherein the first set of at least one job handler and the second set of at least one job handler are identical.

6. The computer-readable storage medium of claim 4, wherein assigning a job request identification to the job request includes:
   establishing a database entry listing the job request identification and the resource selection parameter compilation; and
   wherein selecting the second set of at least one job handler for executing the resubmission of the job request based on the job request identification includes: identifying the at least one resource selection parameter specified in the job request as listed in the database entry, and identifying each resource selection parameter unspecified in the initial submission of the job request that facilitates the selection of the second set of at least one job handler for executing the resubmission of the job request.

7. The computer-readable storage medium of claim 4, wherein assigning a job request identification to the job request includes:
   establishing a database entry listing the job request identification and the first set of at least one job handler; and
   wherein selecting the second set of at least one job handler for executing the resubmission of the job request based on the job request identification includes: identifying the first set of at least one job handler as listed in the database entry.

8. A system, comprising:
   a processor; and
   a memory storing instructions executable by the processor to perform operations, a job requester and a grid manager collectively implementing the operations, the operations comprising:
   receiving an initial submission of the job request at the grid manager from the job requester, the job request specifying at least one resource selection parameter, the at least one resource selection parameter facilitating a selection of a first set of at least one job handler for executing the initial submission of the job request, the job handlers of the first set suitable for executing the job request in accordance with the at least one resource selection parameter;
   selecting the first set of at least one job handler for executing the initial submission of the job request based on the at least one resource selection parameter specified in the initial submission of the job request; and assigning a job request identification to the job request, wherein the job request identification corresponds to a resource selection parameter compilation including the at least one resource selection parameter specified in the initial submission of the job request and one or more unspecified resource selection parameters relating to a resource characteristic of a job handler selected to execute the initial submission of the job request that are unspecified in the initial submission of the job request that facilitate a selection of a second set of at least one job handler for executing a resubmission of the job request from any job request source, the resubmission of the job request specifying the job request identification and excluding the at least one resource selection parameter, the grid manager recognizing the job request identification as the at least one resource selection parameter specified in the initial submission of the job request and the one or more unspecified resource selection parameters.

9. The system of claim 8, wherein assigning a job request identification to the job request includes: establishing a database entry listing the job request identification and the resource selection parameter compilation.

10. The system of claim 8, wherein assigning a job request identification to the job request includes: establishing a database entry listing the job request identification and the first set of at least one job handler.

11. The system of claim 8, wherein the instructions are further executed for:
receiving the resubmission of the job request including the job request identification for facilitating the selection of the second set of at least one job handler for executing the resubmission of the job request; and
selecting the second set of at least one job handler for executing the resubmission of the job request based on the job request identification.

12. The system of claim 11, wherein the first set of at least one job handler and the second set of at least one job handler are identical.

13. The system of claim 11, wherein assigning a job request identification to the job request includes:
establishing a database entry listing the job request identification and the resource selection parameter compilation; and
wherein selecting the second set of at least one job handler for executing the resubmission of the job request based on the job request identification includes:
identifying the at least one resource selection parameter specified in the job request as listed in the database entry, and
identifying each resource selection parameter unspecified in the initial submission of the job request that facilitates the selection of the second set of at least one job handler for executing the resubmission of the job request.

14. The system of claim 11, wherein assigning a job request identification to the job request includes:
establishing a database entry listing the job request identification and the first set of at least one job handler; and
wherein selecting the second set of at least one job handler for executing the resubmission of the job request based on the job request identification includes: identifying the first set of at least one job handler as listed in the database entry.

15. A server comprising machine-readable instructions stored on a non-transitory computer-readable storage medium, the instructions executable by a processor, a job requester and a grid manager collectively implementing the machine-readable instructions, the machine-readable instructions comprising:
one or more instructions for receiving an initial submission of a job request from a job requestor at a grid manager, the job request specifying at least one resource selection parameter, the at least one resource selection parameter facilitating a selection of a first set of at least one job handler for executing the initial submission of the job request;
one or more instructions for selecting the first set of at least one job handler for executing the initial submission of the job request based on the at least one resource selection parameter specified in the initial submission of the job request, the job handlers of the first set suitable for executing the job request in accordance with the at least one resource selection parameter;
one or more instructions for assigning a job request identification to the job request, wherein the job request identification corresponds to a resource selection parameter compilation including the at least one resource selection parameter specified in the initial submission of the job request and one or more unspecified resource selection parameters relating to a resource characteristic of a job handler selected to execute the initial submission of the job request that are unspecified in the initial submission of the job request that facilitate a selection of a second set of at least one job handler for executing a resubmission of the job request by the job requester;
one or more instructions for receiving the resubmission of the job request, the resubmission of the job request including the job request identification for facilitating the selection of the second set of at least one job handler for executing the resubmission of the job request and excluding the at least one resource selection parameter, the grid manager recognizing the job request identification as the at least one resource selection parameter specified in the initial submission of the job request and the one or more unspecified resource selection parameters; and
one or more instructions for selecting the second set of at least one job handler for executing the resubmission of the job request based on the job request identification.

16. A method, a job requester and a grid manager collectively implementing the method, the method comprising:
receiving, using a grid manager, an initial submission of a job request at the grid manager from a job requestor, the job request specifying at least one resource selection parameter, the at least one resource selection parameter facilitating a selection of a first set of at least one job handler for executing the initial submission of the job request, the job handlers of the first set suitable for executing the job request in accordance with the at least one resource selection parameter;
selecting, using the grid manager, the first set of at least one job handler for executing the initial submission of the job request based on the at least one resource selection parameter specified in the initial submission of the job request; and
assigning, using the grid manager, a job request identification to the job request, wherein the job request identification corresponds to a resource selection parameter compilation including the at least one resource selection parameter specified in the initial submission of the job request and one or more unspecified resource selection parameters relating to a resource characteristic of a job handler selected to execute the initial submission of the job request that are unspecified in the initial submission of the job request that facilitate a selection of a second set of at least one job handler for executing a resubmission of the job request by any job request source, the resubmission of the job request specifying the job request identification and excluding the at least one resource selection parameter, the grid manager recognizing the job request identification as the at least one resource selection parameter specified in the initial submission of the job request and the one or more unspecified resource selection parameters, the grid manager comprising at least one of logic hardware and executable code, the executable code stored on one or more non-transitory computer readable media.

17. The method of claim 16, wherein assigning a job request identification to the job request includes: establishing a database entry listing the job request identification and the resource selection parameter compilation.

18. The method of claim 16, wherein assigning a job request identification to the job request includes: establishing a database entry listing the job request identification and the first set of at least one job handler.

19. The method of claim 16, wherein the instructions are further executed for:
   receiving the resubmission of the job request including the job request identification for facilitating the selection of the second set of at least one job handler for executing the resubmission of the job request; and
   selecting the second set of at least one job handler for executing the resubmission of the job request based on the job request identification.

20. The method of claim 19, wherein the first set of at least one job handler and the second set of at least one job handler are identical.

21. The method of claim 19, wherein assigning a job request identification to the job request includes:
   establishing a database entry listing the job request identification and the resource selection parameter compilation; and
   wherein selecting the second set of at least one job handler for executing the resubmission of the job request based on the job request identification includes:
      identifying the at least one resource selection parameter specified in the job request as listed in the database entry, and
      identifying each resource selection parameter unspecified in the initial submission of the job request that facilitates the selection of the second set of at least one job handler for executing the resubmission of the job request.

22. The method of claim 19, wherein assigning a job request identification to the job request includes:
   establishing a database entry listing the job request identification and the first set of at least one job handler; and
   wherein selecting the second set of at least one job handler for executing the resubmission of the job request based on the job request identification includes:
      identifying the first set of at least one job handler as listed in the database entry.

23. A system, comprising:
   a job requester;
   a resource pool of job handlers;
   a grid manager in electrical communication with the job requester and the resource pool of job handlers, the job requester, the job handlers, and the grid manager each comprising at least one of logic hardware and executable code, the executable code stored on one or more non-transitory computer readable media, the job requester and the grid manager collectively implementing the executable code,
   the job requester initially submitting a job request to the grid manager, the job request specifying at least one resource selection parameter, the at least one resource selection parameter facilitating a selection of a first set of at least one job handler for executing the initial submission of the job request, the job handlers of the first set suitable for executing the job request in accordance with the at least one resource selection parameter,
   the grid manager selecting the first set of at least one job handler for executing the initial submission of the job request based on the at least one resource selection parameter specified in the initial submission of the job request, and
   the grid manager further assigning a job request identification to the job request, the job request identification corresponding to a resource selection parameter compilation including the at least one resource selection parameter specified in the initial submission of the job request and one or more unspecified resource selection parameters relating to a resource characteristic of a job handler selected to execute the initial submission of the job request that are unspecified in the job request that facilitate a selection of a second set of at least one job handler for executing a resubmission of the job request from any job request source, the resubmission of the job request specifying the job request identification and excluding the at least one resource selection parameter, the grid manager recognizing the job request identification as the at least one resource selection parameter specified in the initial submission of the job request and the one or more unspecified resource selection parameters.

24. The system of claim 23, wherein assigning a job request identification to the job request includes: establishing a database entry listing the job request identification and the resource selection parameter compilation.

25. The system of claim 23, wherein assigning a job request identification to the job request includes: establishing a database entry listing the job request identification and the first set of at least one job handler.

26. The system of claim 23,
   wherein the job requester is further operable to resubmit the job request including the job request identification for facilitating the selection of the second set of at least one job handler for executing the resubmission of the job request; and
   wherein the grid manager is further operable to select the second set of at least one job handler for executing the resubmission of the job request based on the job request identification.

27. The system of claim 26, wherein the first set of at least one job handler and the second set of at least one job handler are identical.

28. The system of claim 26,
   wherein assigning a job request identification to the job request includes:
      establishing a database entry listing the job request identification and the resource selection parameter compilation; and wherein selecting the second set of at least one job handler for executing the resubmission of the job request based on the job request identification includes:
  identifying the at least one resource selection parameter specified in the job request as listed in the database entry, and
  identifying each resource selection parameter unspecified in the initial submission of the job request that facilitates the selection of the second set of at least one job handler for executing the resubmission of the job request.

29. The system of claim 26,
wherein assigning a job request identification to the job request includes:
  establishing a database entry listing the job request identification and the first set of at least one job handler; and
wherein selecting the second set of at least one job handler for executing the resubmission of the job request based on the job request identification includes:
  identifying the first set of at least one job handler as listed in the database entry.

30. A non-transitory computer-readable storage medium tangibly embodying a program of machine-readable instructions executable by a processor to perform operations, a job requester and a grid manager collectively implementing the operations, the operations comprising:
  receiving an initial submission of a job request at a grid manager from a job requester, the initial submission comprising at least one resource selection parameter;
  identifying a first set of job handlers that are suitable for executing the job request in accordance with the at least one resource selection parameter;
  selecting a job handler from the first set of job handlers for executing the initial submission of the job request;
  assigning a job request identification to the job request;
  receiving a resubmission of the job request from any job request source, the resubmission of the job request comprising the job request identification and excluding the at least one resource selection parameter, the resubmission of the job request received after the initial submission of the job request;
  identifying a second set of job handlers that have:
    the at least one resource selection parameter of the initial submission of the job request; and
    one or more unspecified resource selection parameters relating to a resource characteristic of the job handler selected to execute the initial submission of the job request that were unspecified in the initial submission of the job request; and
  selecting a job handler from the second set of job handlers for executing the resubmission of the job request using the job request identification, the grid manager recognizing the job request identification as the at least one resource selection parameter specified in the initial submission of the job request and the one or more unspecified resource selection parameters.

\* \* \* \* \*